(No Model.)
D. H. RICE.
BALL AND ROLLER BEARING FOR SHAFTS.
No. 322,482. Patented July 21, 1885.
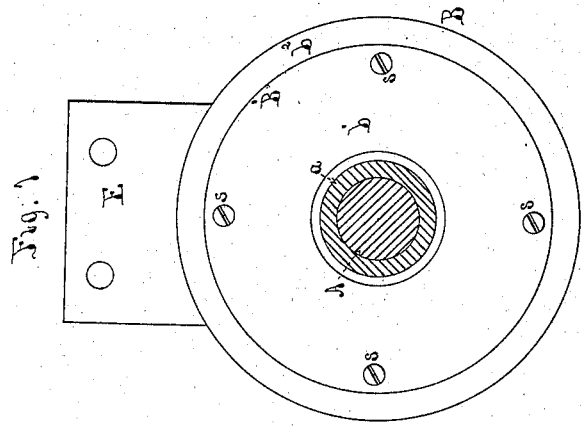
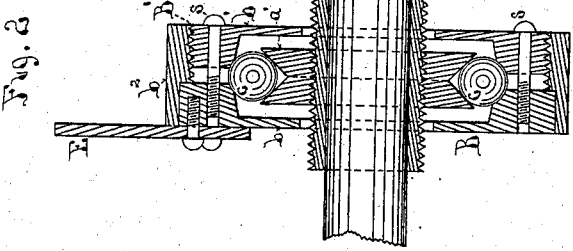
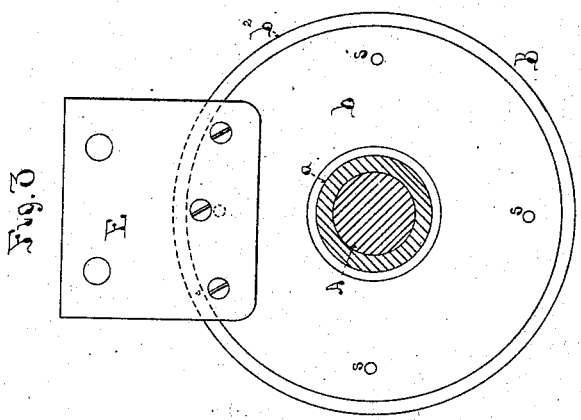
Witnesses
Wm. S. Brown
N. P. Ockington
Inventor
David Hall Rice

UNITED STATES PATENT OFFICE.

DAVID HALL RICE, OF LOWELL, MASSACHUSETTS.

BALL AND ROLLER BEARING FOR SHAFTS.

SPECIFICATION forming part of Letters Patent No. 322,482, dated July 21, 1885.

Application filed June 17, 1885. (No model.)

*To all whom it may concern:*

Be it known that I, DAVID HALL RICE, of Lowell, in the county of Middlesex and State of Massachusetts, have invented a new and useful Improvement in Ball and Roller Bearings for Shafts, &c., of which the following is a specification.

My improvement relates to ball and roller bearings for shafts and other similar mechanisms; and it consists in providing certain new and useful attachments for facilitating the adjustment of the same, substantially as hereinafter described and claimed.

In the drawings, Figure 1 is a face view of a roller-bearing provided with my improvements. Fig. 2 is a section of the same longitudinally of the shaft. Fig. 3 is a view of the opposite face from that shown in Fig. 1.

A is the shaft, which has attached to it the enlargement $a$, on the exterior of which a screw-thread is cut. Upon this is screwed the collar $a'$, having a groove or trough around its outer periphery to receive the rollers $c\ c$. This collar may be also pinned or otherwise fastened to the enlargement $a$ in any well-known manner to prevent its moving thereon after being screwed onto its proper position.

Outside of the rollers $c\ c$ is placed the box B, formed of two parts or sections, $b$ B′, secured together by the screws $s\ s$, so that their inner faces shall abut together, in the manner well known, when the screws are set up. These sections of the box are divided in a plane at right angles to the shaft, passing through the central part of the rollers all around, and the part B′ is made to overlap the part $b$, to exclude dirt and dust from this division-line. I however modify the part of the box B′ by constructing it in two separate parts or pieces, $b'\ b^2$, in the general form of an inner annular disk and an outer disk or sleeve inclosing the inner one, the two being screwed together to form a unit with relation to the other part, $b$, of the box by an internal and external screw-thread, as shown. The function of these two divisions $b'\ b^2$ of the part B′ of the box is to enable me to form a movable or shifting face to this part of it, which bears against the opposite part of the box $b$, and regulates the distance to which the screws $s\ s$ shall be set up to secure the two parts of the box together and adjust them to the rollers $c\ c$. The outer annular division, $b^2$, of the part B′ of the box accomplishes this in the following manner: Let it be supposed that the parts were originally adjusted in the position shown in Fig. 2, and that the rollers and bearing-surfaces have worn so that they fit too loosely upon each other and the shaft-bearing surface $a'$. By starting or turning back the screws $s\ s$ the bearing-faces of the parts $b$ and B′ of the box against each other will be loosened. Then the outer annular division, $b^2$, of the part B′ of the box is screwed upon the inner division, $b'$, so as to carry it toward the right the proper distance. Next, the screws $s\ s$ are set up again until the bearing-face of the part B′ is brought against that of the opposite part, $b$, of the box, and the latter will be found to be readjusted as closely upon the rollers as desired. This construction obviates all difficulty of setting up the screws $s\ s$ exactly even, as occurs when the two parts $b$ B′ of the box are formed of two pieces of metal only, and the proper adjustment does not bring the faces of these two parts of the box quite together. It will be observed that this is accomplished by having the inner annular division, $b'$, of the part B′ of the box carry the bearing-surface which comes against the roller and the outer annular division, $b^2$, carry the bearing-surface that comes against the opposite part of the box. The outer and inner annular divisions, $b'\ b^2$, may be secured together and made adjustable upon each other by other means than a screw-thread, if desired; but I prefer that construction.

The combination of the two parts $b$ B′ by the screws $s\ s$ serves both to hold the outer and inner annular divisions of the part B′ from moving or turning upon each other, and to prevent all play or rattle of the parts.

E is an ear-piece, secured to the box B to enable it to be attached to any support, or to enable any part of a vehicle—as a bicycle or tricycle—to be attached to it.

Instead of the form of rollers shown, any other form having conoidal ends or beveled ends may be used, if desired; also, when the inner bearing-surface, $a'$, of the rollers is divided or split radially and the outer or box bearing-surface is left entire, the same construction of divisions $b'\ b^2$ can be applied to one of the parts of the split bearing-surface $a$ with the same effect as above described, and still be within the scope of my invention.

What I claim as new and of my invention is—

1. The combination, with the rollers $c\,c$, presenting beveled or inclined surfaces to the bearing-surfaces of the shaft and surrounding box, of inner shaft roller-bearing surfaces and outer box roller-bearing surfaces, embracing said rollers, having said embracing bearing-surfaces divided radially on one side of the rollers into two divisions, $b$ B', and one of these divisions subdivided into outer and inner annular subdivisions, $b'\,b^2$, adjustably connected together, one of which carries the roller-bearing surface and the other of which carries the bearing-surface which presses against the division opposite thereto, substantially as described.

2. The combination of the rollers $c\,c$ with the shaft-bearing surfaces $a'$ and the radially-divided box bearing-surfaces, $b$ B', the latter being subdivided into annular divisions, $b'\,b^2$, adjustably connected together, one of which carries the roller-bearing surface and the other the surface pressing against the opposite part, $b$, substantially as described.

DAVID HALL RICE.

Witnesses:
WILLIAM P. BLAKE,
N. P. OCKINGTON.